United States Patent Office 3,442,846
Patented May 6, 1969

3,442,846
INSULATING VARNISHES BASED ON METHYLOL DIPHENYLOXIDES
Henri Vayson de Pradenne, Paris, France, assignor to Societe Generale de Constructions Electriques et Mecaniques, Paris, France
No Drawing. Filed Nov. 12, 1965, Ser. No. 507,517
Int. Cl. C08g 17/04, 17/133
U.S. Cl. 260—30.4                   3 Claims

ABSTRACT OF THE DISCLOSURE

The curing time of the heat condensation product of hydroxymethyldiphenyloxide in the presence of phosphoric acid is substantially reduced by the addition of a polyfunctional aromatic acidic cross-linking agent.

---

Methyloldiphenyloxide is one of the members of the family of chemical products derived from diphenyl oxide, manufactured by the Dow Chemical Company.

It is available as pure p,p'-dimethyloldiphenyloxide given by the formula (1) 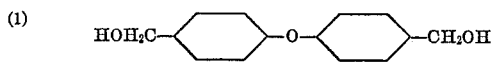

and in the form of a mixture of ortho- and para- isomers with a certain proportion of mono-, tri- and tetra- derivatives so substituted that they are obtained by the treatment of the mixture of chloromethylated diphenyloxides obtained from the chloromethylation of diphenyloxide.

French patent 1,321,191 of Apr. 26, 1962, of the Dow Chemical Company discloses a method for producing aromatic ether resins from these mixtures by condensation in the presence of catalysts of the Friedel-Crafts type, or from strong protonic acids, at temperatures between 130° and 180° C. The reaction has water as a byproduct and its duration is a function of the composition of the treated mixture, i.e., of its richness in methylol groups and also upon the catalyst used and of the treatment temperature.

A preferred condensation agent is phosphoric acid, the presence of which contributes to the fireproofing properties of the final product. At temperatures of 160° C. and higher, about 1 per cent of the weight of the polymerizable composition is given as the useful limit.

The importance of cross-linked resins obtained from methyloldiphenyloxides lies in their temperature stability which is better than the usual phenoplastic resins and in their greater flexibility as well as their improved resistance to attack by hydrolysis or saponification agents, and their stability to light, due to the absence of free phenolic hydroxyl groups. If they are to be used industrially as a varnish for laminations or impregnations, the cross-linking must be carried to a sufficiently advanced stage so that the thermal treatment imparted to the impregnated support at the time of final conformation and hardening could be done under conditions compatible with the industrial installations, from the viewpoint of duration as well as temperature.

It was found that by condensing commercially available mixtures of hydroxymethyldiphenyloxides, even those containing the largest number of hydroxyl functions, it is impossible, by using phosphoric acid only as the condensation catalyst, to obtain condensates with a sufficiently advanced degree of condensation for their industrial use, for example, as lamination binders or impregnation varnishes for electrical apparatus.

Thus, by fusing 500 grams of the oxidized hydroxymethyldiphenyl mixture, containing about 14 percent of hydroxyl groups, adding 10 grams of 85 percent phosphoric acid and heating for 3½ hours at 165° C. (followed by a temperature rise to 175° C. and a longer duration), all that is obtainable is a condensate whose polymerization velocity on a metal block heated to 200° C. is 10 seconds or more.

Now, experience shows that if the resin is to be used as a lamination binder on a glass fiber or other support, or as a varnish base for impregnating electrical apparatus, it must have a polymerization rate at 200° C. which does not exceed 4 to 5 seconds. Otherwise, its treatment at the final hardening stage will require temperatures and durations which are incompatible with current industrial practice.

An increase in the amount of catalyst such as phosphoric acid has only a slight effect on the reaction time, but it does not affect at all the rate of polymerization of the condensate at the time of its final hardening according to the test on a block at 200° C.

The invention relates to insulating varnishes based on methyloldiphenyloxide (HMPDO), characterized in that a methyloldiphenylic condensate obtained by heating a mixture of hydroxymethyldiphenyloxides with phosphoric acid is combined with a cross-linking agent which can react with the condensate, the condensation taking place in a solvent. In such a combination the cross-linking agent is used in the amount of the order of 5 percent by weight based on the weight of the hydroxymethyldiphenyloxide and phosphoric acid and reaction product.

Cross-linking agents which were found particularly effective and the presence of which does in no way impair the desirable properties of the resin, such as mentioned at the beginning, are the acids and anhydrides of polyfunctional acids having reactive groups on a benzene nucleus, such as: pyromellitic dianhydride, trimellitic anhydride, anhydride of tetracarboxylic benzophenone acid, and anhydrides of tetracarboxylic diphenolic acids used in preference to other possible cross-linking agents.

To insure low cost and good characteristics of the cross-linked product, use is advantageously made of trimellitic anhydrides of the formula (2) 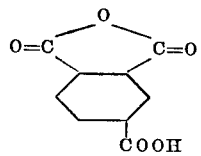

Having condensed a mixture of hydroxymethyldiphenyloxides with the phosphoric acid as described above, a solution of trimellitic anhydride in dioxane is added and the condensation is continued in an excess of this solvent whereby the reaction is rapid and easy. Thus, to the condensate of 500 grams of HMDPO with 10 grams of phosphoric acid are added:

|  | Grams |
| --- | --- |
| Trimellitic anhydride | 25 |
| Dioxane | 350 | followed by heating for about 2 hours at 170° C. until a resin is obtained which is polymerized on a block at 200° C. in 2 to 3 seconds. This condensate will then have the required reactivity for industrial usage.

It can be expected that in the course of the complementary cross linking by the acid anhydride, the acid and anhydride functions of it react on the residual methylol groups of the HMDPO condensate, creating intramolecular bonds of the type shown below:

(3)

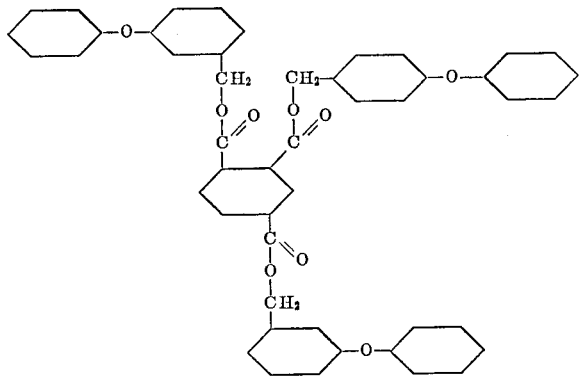

and the reaction of acid and anhydride functions on these residual methylol groups is faster and easier than their interaction. Moreover, the incorporation of a benzene nucleus originating in the trimellitic anhydride is a thermally stabilizing element for binders like the trimellitic ester function which is added to the existing etheroxide binder. This is proved by the test of thermal stability of the hardened resin. The following table gives the losses in weight as a function of time in a ventilated oven at 250° C.

|   | Percent |
|---|---|
| After—2 hours | 3.27 |
| 24 hours | 3.79 |
| 48 hours | 3.83 |
| 96 hours | 3.90 |
| 200 hours | 3.94 |

The above results are fully comparable with those obtained with a phosphoric acid condensate not cross-linked by the trimellitic anhydride. These results correspond to those required for Class H insulating material.

The solution of the condensate in the form of an impregnation or coating varnish made by dissolving it directly in dioxane can be used, for example, for application to Class H D-C motor windings or for any other motor, to impregnate insulating supports such as glass fabrics, or for enameling sheets of metal.

It is known that the silicone varnishes which give a Class H insulation are unsuitable or poorly suited for the impregnation of windings because of the rapid wear of carbon brushes due to the deposit of silica which they form on the commutator. The varnish on the base of the condensate of methyloldiphenyloxide has the same thermal stability as the silicone condensate, do not wear down carbon brushes, and cost less than silicone insulation.

What I claim as new and desire to secure by Letters Patent of the United States is:

1. An insulating material comprising the product of the reaction between (1) the condensation product of hydroxymethyldiphenyloxide, condensed in the presence of phosphoric acid at a temperature of about 165° to 175° C., and (2) a solution of a polyfunctional aromatic carboxylic acid cross-linking agent, the cross-linking agent being about 5% by weight of (1) and where (1) and (2) are heated for about 2 hours at a temperature of about 170° C. until said insulating material has a polymerization rate at 200° C. of up to about 5 seconds.

2. A material as in claim 1 where the solvent is dioxane.

3. A material as in claim 1 where the cross-linking agent is trimellitic anhydride.

References Cited

UNITED STATES PATENTS

| 3,177,090 | 4/1965 | Bayes | 117—72 |
| 3,330,806 | 7/1967 | Borman | 260—33.6 |
| 3,159,597 | 12/1964 | Forsythe | 260—30.4 |

MORRIS LIEBMAN, *Primary Examiner.*

L. T. JACOBS, *Assistant Examiner.*

U.S. Cl. X.R.

260—47